US010087381B2

(12) United States Patent
Brem et al.

(10) Patent No.: US 10,087,381 B2
(45) Date of Patent: Oct. 2, 2018

(54) PROCESS FOR CONVERSION OF A FEEDSTOCK COMPRISING SOLID CARBONACEOUS PARTICLES INTO AT LEAST A GASEOUS COMPOUND

(71) Applicant: Alucha Management B.V., Arnhem (NL)

(72) Inventors: Gerrit Brem, Wapenveld (NL); Eduard Augustinus Bramer, Albergen (NL)

(73) Assignee: ALUCHA MANAGEMENT B.V., Arnhem (NL)

( * ) Notice: Subject to any disclaimer, the term of this patent is extended or adjusted under 35 U.S.C. 154(b) by 102 days.

(21) Appl. No.: 15/034,761

(22) PCT Filed: Nov. 6, 2013

(86) PCT No.: PCT/EP2013/073158
§ 371 (c)(1),
(2) Date: May 5, 2016

(87) PCT Pub. No.: WO2015/067310
PCT Pub. Date: May 14, 2015

(65) Prior Publication Data
US 2016/0281010 A1 Sep. 29, 2016

(51) Int. Cl.
*C10J 3/46* (2006.01)
*C10J 3/02* (2006.01)
(Continued)

(52) U.S. Cl.
CPC ............ *C10J 3/466* (2013.01); *B01J 8/0025* (2013.01); *B01J 8/0085* (2013.01); *B01J 8/14* (2013.01);
(Continued)

(58) Field of Classification Search
USPC .......................................................... 423/650
See application file for complete search history.

(56) References Cited

U.S. PATENT DOCUMENTS

| 2,516,141 A | 7/1950 | Newman |
| 3,647,357 A | 3/1972 | Niedner et al. |
| (Continued) | | |

FOREIGN PATENT DOCUMENTS

| DE | 38 14 723 A1 | 11/1988 |
| FR | 1207478 | 2/1960 |
| WO | WO-01/34725 | 5/2001 |

OTHER PUBLICATIONS

International Search Report issued in International Patent Application No. PCT/EP2013/073158, dated Jul. 7, 2014.

*Primary Examiner* — Douglas B Call
(74) *Attorney, Agent, or Firm* — Gilberto M. Villacorta; Sunit Talapatra; Foley & Lardner LLP

(57) ABSTRACT

The invention relates to a process for conversion of a feedstock comprising solid particles into at least a gaseous compound in a reactor comprising a vertically extending swirl chamber comprising a conical upper part with a decreasing diameter in upward direction, at least one tangential inlet at the bottom of the swirl chamber, and an outlet at the upper end of the swirl chamber, wherein the process is selected from pyrolysis, allothermal gasification or carbonization of a carbonaceous feedstock. The invention further relates to a process for conversion of a feedstock comprising solid particles into at least one or more gaseous compounds in such reactor.

11 Claims, 1 Drawing Sheet

(51) Int. Cl.
*C10J 3/48* (2006.01)
*B01J 8/14* (2006.01)
*B01J 8/00* (2006.01)
*C10B 49/12* (2006.01)
*C10L 9/08* (2006.01)
*C10B 47/22* (2006.01)
*C10B 49/20* (2006.01)
*C10B 53/02* (2006.01)
*C10B 57/06* (2006.01)
*C01B 3/02* (2006.01)

(52) U.S. Cl.
CPC ............ *C01B 3/02* (2013.01); *C10B 47/22* (2013.01); *C10B 49/12* (2013.01); *C10B 49/20* (2013.01); *C10B 53/02* (2013.01); *C10B 57/06* (2013.01); *C10J 3/487* (2013.01); *C10L 9/083* (2013.01); *B01J 2208/00265* (2013.01); *C10J 2300/0946* (2013.01); *C10J 2300/0956* (2013.01); *C10J 2300/0986* (2013.01); *C10J 2300/1807* (2013.01); *Y02E 50/14* (2013.01); *Y02E 50/15* (2013.01)

(56) References Cited

U.S. PATENT DOCUMENTS

| | | | |
|---|---|---|---|
| 4,479,920 A | 10/1984 | Dodson | |
| 4,929,789 A | 5/1990 | Gupta et al. | |
| 6,475,462 B1 * | 11/2002 | Dodson | B01J 8/0015 |
| | | | 422/145 |
| 6,883,442 B1 * | 4/2005 | Groszek | C10J 3/482 |
| | | | 110/204 |

* cited by examiner

PROCESS FOR CONVERSION OF A FEEDSTOCK COMPRISING SOLID CARBONACEOUS PARTICLES INTO AT LEAST A GASEOUS COMPOUND

CROSS-REFERENCE TO RELATED APPLICATIONS

This application is the National Phase of International Patent Application No. PCT/EP2013/073158, filed Nov. 6, 2013, published on May 14, 2015 as WO 2015/067310 A1. The contents of which are herein incorporated by reference in its entirety.

FIELD OF THE INVENTION

The invention relates to a process for conversion of a feedstock comprising solid carbonaceous particles into at least a gaseous compound, wherein the process is selected from pyrolysis, allothermal gasification or carbonisation of a carbonaceous feedstock.

BACKGROUND OF THE INVENTION

Pyrolysis of solid carbonaceous materials such as for example biomass or carbonaceous waste materials is carried out by heating the solid material under non-oxidising conditions. The solid carbonaceous materials is first heated and then decomposed into gaseous compounds. Condensable gases formed during the pyrolysis are cooled to obtain a liquid phase called pyrolysis oil. Conventionally, pyrolysis has been carried out with relatively long residence time of the solid feedstock particles in the pyrolysis reactor. This leads, however, to undesired secondary cracking reactions and a relatively low yield of pyrolysis oil. A higher yield of pyrolysis oil, higher efficiency and less secondary reactions are achieved in so-called flash pyrolysis. In a flash pyrolysis process, relatively small particles of the feedstock, typically with a diameter in the order of a few millimeters, are fed to a reactor and heated for a relatively short time under continuous movement of the particles. The gaseous phase formed is cooled and condensed before extensive secondary reactions occur. Known suitable reactors for flash pyrolysis, also referred to as fast pyrolysis, include cyclone and swirl reactors.

In WO 01/34725 for example is disclosed a cyclone reactor for flash pyrolysis. A feed stream comprising feed particles and a carrier gas is introduced into the cyclone reactor near the top of the reactor. A product stream comprising solids is discharged from the reactor at the bottom and a gaseous stream steam is discharged at the top of the reactor.

In cyclone-type reactors, the solid material to be pyrolysed has a certain, finite residence time since the particles are forced to the bottom outlet of the reactor due to gravity forces. In case of a feedstock comprising particles above a certain critical size, such larger particles will be discharged from the reactor before they are sufficiently converted. In the art, swirl or cyclone pyrolysis reactors or operating modes for such reactors have been proposed to increase the residence time of larger particles. In WO 01/34725 for example is mentioned that the cyclone reactor may be operated 'bottom-up". A feed stream comprising feed particles and a carrier gas is then introduced into the cyclone reactor near the bottom of the reactor. Solid particles move upwards with a speed depending on the force balance of gravity and drag. The solid particles are discharged from the cyclone reactor via an inner cyclone placed in the outer cyclone and thus leave the reactor at the bottom end (see FIG. 3a of WO 01/34725). In WO 01/34725 is further mentioned a swirl-type reactor (see FIG. 3b of WO 01/34725) wherein a feed stream comprising feedstock particles and a carrier gas is introduced into a swirl tube near the bottom of the tube and solid particles and a gaseous stream are exiting the swirl tube as separate streams at the top of the tube.

In DE 3814723 is disclosed a swirl-type pyrolysis reactor wherein large particles have a longer residence time than small particles. In the reactor of DE 3814723, a feed stream comprising solid feedstock and a carrier gas is tangentially introduced at the bottom of an annular swirling reaction vessel. At the top of the annular swirling reactor, the swirling reaction mixture comprising solid and gaseous material is forced to flow down into an inner annular channel acting as a cyclone. In the cyclone, solid or fluid particles are separated from the gaseous stream. At the bottom of the inner annual channel, solid particles are recycled into the (outer) annular reaction space to undergo another reaction cycle. Gaseous product is discharged from the reactor via an inner exit tube.

Although reactors for pyrolysis processes wherein the residence time of large particles are increased are known, there is still a need for improvement for such processes, in particular for improved control of residence time of feedstock particles as a function of the particle size and of improved control of residence time of gaseous products formed, in order to avoid over-reaction and secondary cracking reactions.

SUMMARY OF THE INVENTION

It has now been found that in processes wherein solid carbonaceous material is heated and decomposed into at least one gaseous compound, such as for example pyrolysis, allothermal gasification, torrefaction or carbonisation processes, the residence time of solid feed material particles can be controlled and self-regulated as a function of particle size or mass if the process is carried out in a specific swirl-type reactor. The reactor has a vertically extending swirl chamber wherein a solid carbonaceous material can be converted whilst being brought in a swirling movement in a layer on the wall of the swirl chamber by means of an inert carrier gas. The swirl chamber comprises at least one tangential inlet at the bottom of the swirl chamber for supplying the carrier gas and optionally also the feedstock, and a conical upper part, with decreasing diameter towards the upper end of the chamber, wherein the reaction takes place. Feedstock and carrier gas are both introduced in the swirl chamber at its bottom. The swirl chamber may comprise a lower part with increasing, constant or slightly decreasing diameter that is directly passing into the conical upper part. The lower part serves to establish a layer of swirling feedstock particles on the wall of the swirl chamber. The conversion reaction takes place in the upper conical part of the swirling chamber, in a layer of feedstock particles formed on the wall of the conical part of the swirl chamber. The reactor further has an outlet at its upper end for discharging gas and small particles from the swirl chamber.

Accordingly, the invention relates to a process for conversion of a feedstock comprising solid carbonaceous particles into at least one or more gaseous compounds in a reactor, wherein the process is a process selected from pyrolysis, allothermal gasification, torrefaction, or carbonisation of the carbonaceous feedstock, and wherein the reactor comprises:

a vertically extending swirl chamber defined by a wall, a bottom and an upper end, the swirl chamber comprising a conical upper part with a decreasing diameter in upward direction, wherein the wall of the conical upper part of the swirl chamber has a first angle with the vertical;

at least one tangential inlet at the bottom of the swirl chamber; and an outlet at the upper end of the swirl chamber, wherein the feedstock is supplied to the swirl chamber at the bottom of the swirl chamber, an inert carrier gas is tangentially supplied to the swirl chamber through the at least one tangential inlet, and a layer of feedstock particles is formed on the wall of the conical upper part of the swirl chamber, and wherein at least part of the feedstock is converted into at least one of more gaseous compounds in the swirl chamber at elevated temperature and wherein the conversion takes place in the layer of feedstock particles on the wall of the conical upper part of the swirling chamber, and wherein a stream comprising the one or more gaseous compounds is discharged via the outlet.

An important advantage of the process according to the invention compared to the "bottom-up" operated cyclone of WO 01/34725 is that during normal operation of the reactor, not only gravity and drag forces, but also centrifugal forces in the conical upper part of the swirl chamber aid to differentiate the residence time as a function of particle size or mass. Particles with a certain size and mass will, due to the centrifugal forces in the swirl chamber, be rotated at a certain height in the conical upper part of the swirl chamber. The size of feedstock particles will decrease with residence time due to continuing conversion of a solid component of the particles into one or more gaseous compounds. Particles below a certain critical size or mass will exit the swirl chamber with the gaseous compounds formed and the carrier gas via the outlet. For a given conversion process, feedstock and velocity of the inlet stream, the dimensions of the swirl chamber can be chosen such that only particles below a certain size will exit the swirl chamber through the outlet at the upper end.

A further advantage of the process according to the invention is an improved heat transfer between the wall of the swirl chamber and feedstock particles and between feedstock particles in the conical upper part of the swirl chamber. As a result, the feedstock particles are brought to the desired conversion temperature in a shorter time, resulting in a more homogeneous composition of gaseous product formed and, in the case of pyrolysis, in less char production and a higher yield of pyrolysis oil.

Moreover, since the feedstock is brought in a swirling movement in the swirl chamber, the conversion of the feedstock particles takes place in a layer at the wall of the chamber. Gaseous compounds formed will thus be rapidly separated from the particles and discharged from the chamber via the empty reaction space in the centre of the chamber. In the case of flash pyrolysis for example, such rapid separation and discharge results in less undesired secondary reaction and a higher yield of desired pyrolysis oil.

DETAILED DESCRIPTION OF THE INVENTION

Figure 1:
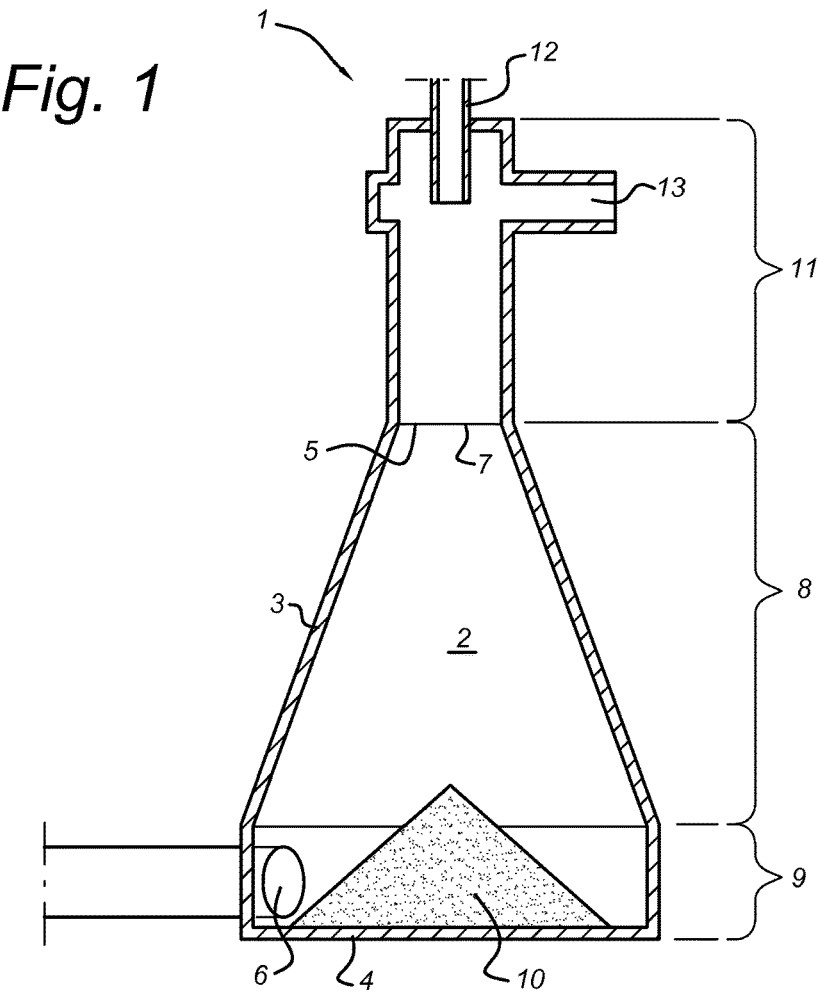
In FIG. 1 is shown a schematic cross-sectional view of a reactor that can be used in the process according to the invention.

The process according to the invention is a process selected from pyrolysis, allothermal gasification, torrefaction, or carbonisation of a carbonaceous feedstock. These are all processes wherein a solid carbonaceous feedstock is heated and then decomposed to yield at least one gaseous compound as reaction product. In these processes, no gas-solid reactions take place and therefore gas is not a reactant. In the process according to the invention, solid feedstock particles are converted into at least one or more gaseous compounds in such way that at least the mass and typically also the size of the particles is reduced.

The feedstock comprises solid carbonaceous particles. Reference herein to a carbonaceous material is to a material comprising carbon atoms. Such materials includes hydrocarbonaceous material, lignocellulose material and synthetic materials. Examples of suitable carbonaceous material include lignocellulosic biomass such as wood, straw, bagasse, miscanthus, grasses, reed, bamboo, agricultural waste streams, manure and paper sludge, other industrial sludges, sewage sludge, heavy hydrocarbonaceous streams such as coal, tar sands, bitumen, the bottom fraction of atmospheric or vacuum distillation of crude oil, and synthetic carbonaceous materials. The feedstock as such may be solid, semi-solid, liquid or gaseous, e.g. a slurry of solid carbonaceous particles in a liquid or a gaseous stream. Preferably, the feedstock is solid. Examples of suitable feedstocks are comminuted biomass, coal, or paper sludge, bitumen, crude oil vacuum distillation bottoms, oil sands, or waste streams such as tar-containing asphalt residues and contaminated soil.

The process according to the invention is carried out in a reactor comprising a vertically extending swirl chamber. The swirl chamber is defined by a wall, a bottom and an upper end. The swirl chamber comprises a conical upper part with a decreasing cross-sectional diameter in upward direction. The wall of the upper conical part of the swirl chamber has a first angle with the vertical. Preferably, the first angle is constant over the entire length of the conical upper part.

The swirl chamber may be entirely conical, i.e. from bottom to upper end. In case of an entirely conical swirl chamber, the wall of the swirl chamber has over its entire length the first angle with the vertical.

Preferably, the swirl chamber further has a lower part that has a constant diameter, an increasing diameter or a decreasing diameter in upward direction. The lower part is directly passing into the conical upper part of the chamber. Thus, the upper end of the lower part is adjacent to the bottom end of the conical part and the conical part has at its bottom end the same cross-sectional diameter as the lower part at its upper end. In case the lower part has a decreasing diameter in upward direction, the wall of the lower part of the swirl chamber has a second angle with the vertical that is smaller than the angle the first angle, i.e. the angle of the wall in the upper part with the vertical. In case the lower part has an increasing diameter in upward direction, the angle of the wall of the lower part with the vertical is preferably at most 20 degrees, more preferable at most 10 degrees.

The reactor comprises at least one tangential inlet at the bottom of the swirl chamber for tangentially supplying an inert carrier gas, and optionally feedstock, catalyst and/or an inert particulate stream, to the swirl chamber. The reactor may comprise an additional, separate inlet at its bottom for supplying feedstock to the swirl chamber. Feedstock may be supplied to the bottom of the swirl chamber in any suitable way, i.e. tangentially, radially or otherwise. Preferably, the reactor comprises a tangential or radial inlet for feedstock at the bottom of the swirl chamber. If the reactor comprises a tangential inlet for feedstock, the reactor preferably comprises one or more tangential inlets through which both feedstock and carrier gas can be supplied. Alternatively, the reactor comprises separate tangential inlets for feedstock and carrier gas. The reactor further comprises an outlet at the upper end of the swirl chamber for discharging a gaseous stream.

In the process according to the invention, a feedstock comprising solid carbonaceous particles is supplied to the bottom of the swirl chamber and an inert carrier gas is tangentially supplied to the swirl chamber through the at least one tangential inlet at the bottom of the swirl chamber. Feedstock and carrier gas may be supplied through the same or through separate inlets. The feedstock is preferably supplied tangentially or radially to the bottom of the swirl chamber. By tangentially supplying the carrier gas to the bottom of the swirl chamber, the feedstock is brought in a swirling movement. Preferably, the swirl chamber contains a conical insert centrally located at the bottom of the swirl chamber in order to provide an annular flow path at the bottom of the swirl chamber for enhancing the swirling movement of the feedstock. The conical insert preferably has a height that at most 0.5 times the length of the swirl chamber, more preferably at most 0.33 times the length of the swirl chamber. In the swirl chamber has a lower part as hereinbefore defined, the height of the conical insert is preferably approximately equal to the length of the lower part of the swirl chamber.

The swirling movement may be further enhanced by supplying the carrier gas through multiple tangential inlets, preferably two or three inlets.

As a result of the swirling movement, feedstock particles form a layer on the wall of the conical upper part of the swirl chamber. Gaseous compounds formed are discharged via the empty reaction space in the centre of the chamber. Preferably, the ratio between the length of the swirl chamber and the largest diameter of the swirl chamber is in the range of from 1 to 10, more preferably of from 2 to 8.

Preferably, the swirl chamber has a lower part that is non-conical part or conical with a smaller angle with the vertical than the conical upper part or with increasing diameter. More preferably, the lower part has a constant diameter and thus is cylindrical. The presence of the lower part has the advantage that a more stable vortex of the carrier gas with feedstock particles is formed in the lower part of the swirl chamber. Further, a more even distribution of feedstock particles over the wall can be achieved if the swirl chamber has a lower part with constant or slightly decreasing or increasing diameter. The formation of a layer of feedstock particles over the entire wall of the swirl chamber is promoted and the formation of so-called strings of feedstock particles on the wall is avoided.

If the lower part is present, the at least one tangential inlet is located in the lower part. Preferably the lower part has a length that is at least two times the height of the inlet opening of the at least one tangential inlet. Preferably the ratio of length of the lower part and length of the upper part of the swirl chamber is at most 1, more preferably at most 0.5.

In the conical upper part, both gravity and centrifugal forces aid to increase the residence time of larger particles. Friction between particles and between the chamber wall and particles enhances heat transfer between the wall and particles and between particles. In order to balance gravity, drag, centrifugal forces and friction, the wall of the conical upper part of the swirl chamber preferably has an angle with the vertical angle in the range of from 5 to 85 degrees, more preferably of from 10 to 60 degrees, even more preferably of from 10 to 40 degrees. This angle is referred to herein as 'the first angle'.

In the process according to the invention, the feedstock particles are converted at elevated temperature. The conversion takes place in the layer of feedstock particles formed on the wall of the conical upper part of the swirl chamber. It will be appreciated that the temperature will depend on the type of conversion process. For pyrolysis of lignocellulose biomass, the elevated temperature preferably is in the range of from 300 to 1000° C., more preferably in the range of from 350 to 800° C., even more preferably of from 400 to 600° C. For carbonisation of lignocellulose biomass, the elevated temperature preferably is in the range of from 200 to 600° C., more preferably of from 300 to 500° C. For allothermal gasification of lignocellulose biomass the elevated temperature preferably is in the range of from 400 to 900° C., more preferably in the range of from 500 to 800° C. For torrefaction of lignocellulose biomass, the elevated temperature preferably is in the range of from 200 to 350° C., preferably of from 230 to 300° C.

If the process is an endothermic process, such as for example pyrolysis and torrefaction, heat for the endothermic reaction has to be provided. This may be done in any suitable way, for example by heating the wall of the swirl chamber, by supplying heated feedstock and/or carrier gas to the swirl chamber, and/or by supplying a particulate heat source in the form of heated catalyst or heated inert particles (e.g. sand) to the swirl chamber.

In case a particulate heat source is supplied to the swirl chamber, such heat source is supplied to the swirl chamber, preferably tangentially through the at least one tangential inlet at the bottom of the swirl chamber. The particulate heat source may be supplied through the same or through a different inlet as the carrier gas, preferably through the same inlet.

The process according to the invention may be a catalytic process such as for example catalytic pyrolysis. In a catalytic process, catalyst particles are supplied to the swirl chamber, preferably tangentially through the at least one tangential inlet. The catalyst particles may or may not serve at the same time as particulate heat source. The size of the catalyst particles may be chosen below the critical size so that catalyst particles are continuously discharged from the swirl chamber via the outlet. Alternatively, larger catalyst particles are used in order to achieve that the catalyst particles will stay in the swirl chamber and no continuous supply of catalyst particles is needed. In case a catalyst is used that needs to be regenerated after a relatively short residence time, for example due to coke deposition on the catalyst particles, it is preferred to use small catalyst particle that are continuously discharged and can thus be regenerated. Spent catalyst particles are then continuously discharged from the swirl chamber. After regeneration of the spent catalyst particles, regenerated catalyst particles are continuously supplied to the swirl chamber. In case of an endothermic conversion process and catalyst regeneration in a combustor to burn coke deposits from the catalyst particles, hot regenerated catalyst particles from the combustor may advantageously be supplied to the swirl chamber and thus serve as particulate heat source for the endothermic conversion process.

In order to bring the feedstock in a swirl movement, a carrier gas is supplied to the swirl chamber. Any suitable inert carrier gas may be used, such as for example nitrogen and/or recycled non-condensable gaseous compounds formed in the process. Reference herein to an inert carrier gas is to a carrier gas that does not react with the feedstock particles under the prevailing reaction conditions.

Preferably, at least part of the carrier gas is provided by non-condensable gaseous compounds formed in the process according to the invention by recycling non-condensable gas separated from the stream comprising the one or more gaseous compounds that is discharged from the swirl chamber to the at least one inlet of the swirl chamber. More preferably, the entire carrier gas is provided by recycled non-condensable gaseous compounds formed in the process. It will be appreciated that during start-up of such process, an external gas stream is needed as carrier gas.

The feedstock to be converted comprises particles. The reactor according to the invention allows the feedstock to be converted to have a broader particle size distribution, in particular a larger fraction of larger particles compared to a process wherein a conventional cyclone or swirl reactor would be used. Preferably, the feedstock comprises particles having such a particle size distribution that at least 90 wt % of the particles have a Sauter mean diameter in the range of from 0.1 to 50 mm, more preferably of from 0.5 to 20 mm. The feedstock preferably comprises particles with a particle size distribution wherein Dp10 is in the range of from 0.1 to 2 mm and Dp90 is in the range of from 10 to 50 mm. Preferably, a feedstock with particles having a Sauter mean diameter in the range of from 1 to 8 mm is used, more preferably of from 2 to 5 mm. Reference herein to particle diameter is to the Sauter mean diameter of the particles.

The gaseous compounds formed, i.e. pyrolysis gas in the case of a pyrolysis process, are discharged from the swirl chamber through the outlet at the upper end of the chamber. Small feedstock particles or small droplets of liquid that may be formed will also be discharged from the swirl chamber through the outlet at the upper end.

The process according to the invention may further comprise means for separately discharging from the process solid particles and a gaseous stream comprising the gaseous compounds formed and carrier gas. This may for example be done by means of a simple cyclone that is connected in series with the swirl chamber. The outlet of the swirl chamber is then directly fed into a cyclone that separately discharges a stream of particles and a gaseous stream comprising the gaseous compounds formed.

Alternatively, and preferably, separate discharge of gas and solid particles is achieved by integrating an axial cyclone in the reactor according to the invention, just upstream of the outlet of the swirl chamber. This may be done by extending the reactor wall upstream of the outlet of the swirl chamber and centrally positioning a central gas outlet pipe in or above the outlet of the swirl chamber. Gaseous components are then discharged via the central gas outlet pipe and particles are discharged via the extended wall, preferably into a vessel or in a downstream reactor for further processing. Due to the fact that the solid feedstock particles move in the same direction, i.e. upwards, as the gaseous compounds in the swirl chamber, the extension of the reactor operates as an axial cyclone and solids and gas can be separated in the reactor without the need of an additional separation device.

In case of a pyrolysis process, the gaseous stream discharged from the swirl chamber is condensed to obtain liquid pyrolysis oil and a stream of non-condensable gas. The non-condensable gas thus obtained is preferably recycled to the swirl chamber to provide at least part of the carrier gas.

For a given process and feedstock with a given particle size distribution and a given mass density of the particles, the flow velocity of the carrier gas and the dimensions of the swirl chamber, i.e. the length of each part, the length to diameter ratio, the angle of the conical upper part with the vertical, are chosen such that only particles below a certain size or mass will be discharged from swirl chamber.

The reactor according to the invention is particularly suitable to be used for flash pyrolysis of paper sludge. Paper sludge is a waste stream obtained in the deinking of used paper. Paper sludge typically comprises ink, plastics, filler and short cellulose fibres. The process according to the invention therefore preferably is a process for flash pyrolysis of paper sludge.

DETAILED DESCRIPTION OF THE DRAWINGS

The process according to the invention will be further illustrated by means of the following, non-limiting drawings.

In FIG. 1 is shown a schematic cross-sectional view of a reactor that can be used in the process according to the invention. Reactor 1 comprises a vertically extending swirl chamber 2 defined by wall 3, bottom 4 and upper end 5. Reactor 1 further comprises one tangential inlet 6 for both feedstock and carrier gas and outlet 7. Swirl chamber 2 has a conical upper part 8 with decreasing diameter in upward direction and a cylindrical bottom part 9 with constant diameter. A conical insert 10 is contained in swirl chamber 2, centrally located at bottom 4 to define an annular flow path for feedstock and carrier gas that is supplied to swirl chamber 2 through inlet 6.

During normal operation of reactor 1, feedstock comprising particles and carrier gas are tangentially supplied to swirl chamber 2 through inlet 6. Feedstock particles are carried with the carrier gas in a swirling movement and form a layer of particles on wall 3. Due to conversion of part of the feedstock particles into gaseous compounds, the size and/or mass of the particle continuously decrease. Due to an equilibrium of centrifugal, drag and gravity forces, particles will swirl against wall 3 at a certain height of upper part 8 of swirl chamber 2, the height mainly depending on the particle size. Particles below a certain critical size will pass outlet 7. Above outlet 7, wall 3 is extended to form extension zone 11 that serves at the same time as a zone for further conversion of particles below the critical size and as an axial cyclone for gas/solid separation. Gas outlet pipe 12 is centrally located in extension zone 11. Gas compounds formed and carrier gas will be discharged from reactor 1 via gas outlet pipe 12. Solid particles are discharged via tangential outlet 13.

Figure 2:
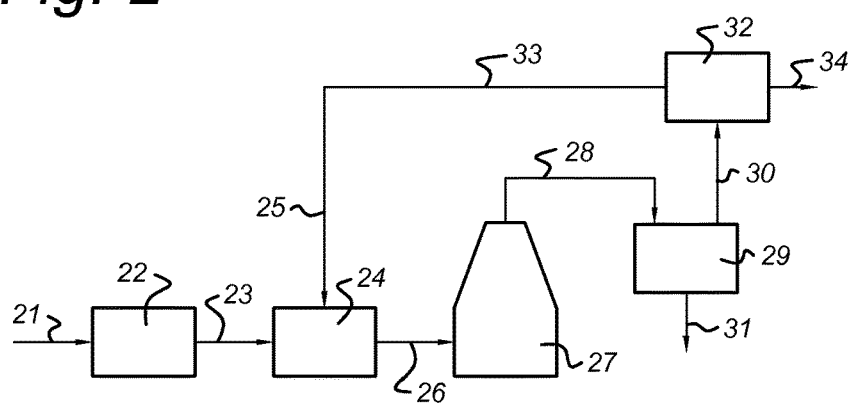
In FIG. 2 is schematically shown a process line-up for the manufacture of pyrolysis oil from paper sludge according to the process of the invention.

In FIG. 2 is schematically shown a process line-up for the manufacture of pyrolysis oil from paper sludge using the reactor according to the invention.

Wet paper sludge 21 is supplied to dryer 22 and dried in dryer 22 by heat exchange with hot gas (not shown). Dried paper sludge 23 is obtained and supplied to mixer 24 wherein it is mixed with hot carrier gas 25. Mixture 26 of dried paper sludge particles and hot carrier gas is tangentially supplied to the bottom of pyrolysis reactor 27. Reactor 27 is a reactor according to the invention comprising a swirl chamber with a conical upper part. In reactor 27, the paper sludge is pyrolysed and a stream 28 comprising particles with a Sauter mean diameter of less than 1 mm, pyrolysis gas and carrier gas is discharged from reactor 27 and supplied to gas/solid separator 29 wherein stream 28 is separated into a gaseous stream 30 comprising pyrolysis gas and carrier gas and a stream of solids 31 comprising char formed during pyrolysis and minerals that were present in the paper sludge. Gaseous stream 30 is condensed in condenser 32 to obtain pyrolysis oil 34 as product and stream of non-condensable gas 33 that is, optionally after heating (not shown), supplied to reactor 27 as carrier gas via mixer 24. Solids 31 may be supplied to a combustor (not shown) to burn the char from the minerals.

The invention will be further illustrated by means of the following non-limiting examples.

EXAMPLES

In a model experiment at ambient temperature, simulating the flow conditions in the swirl chamber of the reactor in the process according to the invention, it was determined at which critical size particles will be discharged from the swirl chamber via the outlet at its upper end.

A model reactor with a glass swirl chamber was built. The swirl chamber had a cylindrical lower part with a constant diameter of 265 mm and a length of 168 mm and a conical upper part with a length of 493 mm and a first angle of 10 degrees (angle of wall of the conical upper part with the vertical). The reactor had two opposite tangential inlets at the bottom of the swirl chamber. The internal diameter of each inlet opening was 30 mm. At its upper end, the swirl chamber had a tangential outlet. In the swirl chamber, a conical solid insert with a height of 170 mm and a diameter of 192 mm was centrally placed at its bottom, to provide for an annular flow path at the bottom of the swirl chamber.

In experiments 1 and 2, dried paper sludge with particles having a hydraulic diameter in the range of from 0.1 to 2.0 mm and having a particle size distribution as given in the Table, was mixed with pressurized air and the resulting mixture was continuously supplied to the swirl chamber via one or two of the tangential inlets. The size of the particles that was continuously discharged from the swirl chamber via its outlet was measured.

Experiment 1

In a first experiment, a single tangential inlet was used. A flow of 10 kg/hr dried paper sludge and 26 m$^3$/hr pressurized air was supplied to the swirl chamber at a velocity of 100 m/s. At these flow conditions, a continuous layer of paper sludge particle was formed on the wall of the swirl chamber. A stream of air with small particles was exiting the swirl chamber via the outlet at the upper end. Of the particles exiting the swirl chamber, more than 95 wt % had a size (Sauter mean diameter) of 1 mm or below.

Experiment 2

In a second experiment, a flow of 15 kg/hr dried paper sludge and 42 m$^3$/hr pressurized air was supplied to the swirl chamber at a velocity of 100 m/s via two opposite tangential inlet. At these flow conditions, a continuous layer of paper sludge particle was formed on the wall of the swirl chamber. A stream of air with small particles was exiting the swirl chamber via the outlet at the upper end. Of the particles exiting the swirl chamber, more than 95 wt % had a size (Sauter mean diameter) of 1 mm or below.

TABLE

| Particle size distribution of dried paper sludge | |
| --- | --- |
| Particle size | wt % |
| <1.0 mm | 14 |
| 1.0-1.4 mm | 21 |
| 1.4-1.7 mm | 33 |
| 1.7-2.0 mm | 32 |

The experimental results show that in the process according to the invention, flow conditions can be created at which only particles below a certain critical size or mass will exit the reactor. Thus, particles will stay in the conical part of the swirl chamber until they are converted to the extent that the size or mass is below the critical size or mass. Thus, the reactor regulates the residence time of the particles as a function of particle size/mass. Particles with a larger size and/or mass that need a longer residence time will stay longer in the conical part of the swirl chamber wherein the conversion takes place and the reactor thus is self-regulating with regard to residence time.

The invention claimed is:

1. A process for converting a feedstock comprising solid carbonaceous particles into at least one or more gaseous compounds, the process comprising:
   (a) supplying the feedstock at the bottom end of a vertically extending swirl chamber defined by a wall, a bottom and an upper end, the swirl chamber comprising a conical upper part with a decreasing diameter in upward direction, wherein the wall of the conical upper part of the swirl chamber has a first angle with the vertical; at least one tangential inlet at the bottom of the swirl chamber; and an outlet at the upper end of the swirl chamber
   (b) supplying an inert carrier gas tangentially to the swirl chamber through the at least one tangential inlet, forming a layer of solid carbonaceous feedstock particles on the wall of the conical upper part of the swirl chamber,
   (c) converting at least part of the solid carbonaceous feedstock into at least one of more gaseous compounds in the swirl chamber at elevated temperature, wherein the converting takes place in the layer of solid carbonaceous feedstock particles, and
   (d) discharging a stream comprising the one or more gaseous compounds via the outlet,
   wherein the process is pyrolysis of the solid carbonaceous particles, and
   wherein the heat for pyrolysis process is provided by heating the wall of the swirl chamber, by supplying heated feedstock to the swirl chamber, by supplying heated carrier gas to the swirl chamber, or combinations thereof, with the proviso that no particulate heat source in the form of heated catalyst particles or heated inert particles is supplied to the swirl chamber.

2. The process according to claim 1, wherein the swirl chamber further comprises a lower part with an increasing, constant or decreasing diameter in upward direction, wherein the lower part directly passes into the conical upper part, and wherein, in case the lower part has a decreasing diameter in upward direction, the wall of the lower part of the swirl chamber has a second angle with the vertical that is smaller than the first angle.

3. The process according to claim 2, wherein the lower part has a constant diameter.

4. The process according to claim 2, wherein the lower part has a length and the upper part has a length and the ratio of the length of the lower part to the length of the upper part is below 1.

5. The process according to claim 4, wherein the ratio of the length to the largest diameter of the swirl chamber is between 2 to 8.

6. The process according to claim 1, wherein the first angle with the vertical is between 10 to 60 degrees.

7. The process according to claim 1, wherein the swirl chamber further comprises a conical insert contained in the swirl chamber, centrally located at the bottom of the swirl chamber and defining an annual flow path at the bottom of the swirl chamber.

8. The process according to claim 1, wherein the feedstock and the carrier gas are tangentially supplied to the swirl chamber through the at least one tangential inlet.

9. The process according to claim 1, wherein at least 90% of the solid carbonaceous particle have a Sauter mean diameter between 0.5 to 20 mm.

10. The process according to claim 1, wherein the feedstock is paper sludge.

11. The process according to claim 1, further comprising recycling non-condensable gas separated from the stream comprising the one or more gaseous compounds to the swirl chamber as at least part of the carrier gas.

* * * * *